Feb. 18, 1941.  E. FALLER ET AL  2,232,057
INDICATOR FOR COMMANDING APPARATUS
Filed May 17, 1939

Inventors:
Emil Faller
Paul Ullrich
by E. D. Phinney
Att'y

Patented Feb. 18, 1941

2,232,057

UNITED STATES PATENT OFFICE 2,232,057

INDICATOR FOR COMMANDING APPARATUS

Emil Faller and Paul Ullrich, Berlin, Germany, assignors to C. Lorenz Aktiengesellschaft, Berlin-Tempelhof, Lorenzweg, Germany, a company Application May 17, 1939, Serial No. 274,144
In Germany May 17, 1938

6 Claims. (Cl. 116—135)

To enable in commanding apparatus a ready indication of the several commands it is desirable to have these compiled on a scale provided with a pointer which is connected to the selective device of such apparatus and is arranged be displaced along this scale to indicate on it the desired command. In order now to enable a quick indication of the commands these should be continually visible all together. The economy of space will be best and the commands will be best readable if such scale is in the nature of a vertically disposed plane table subdivided in sections located one above another. This arrangement, however, in the case of larger numbers of such sections involves a comparatively great length of the scale and hence requires the casing therefor to be given a height undesirable in most cases.

To overcome this disadvantage the invention proposes to make the scale in two parts, located aside each other, thus shortening the paths of adjustment of the pointer, and in order still farther to shorten these paths, proposes to arrange a toothed plate between the two reading surfaces so provided, the teeth of this plate serving alternately to cover either one or the other arm of a double-armed pointer.

Figure 1:
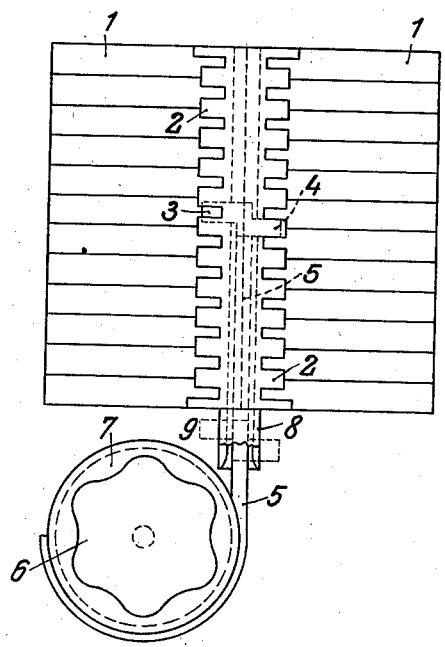
Figure 2:
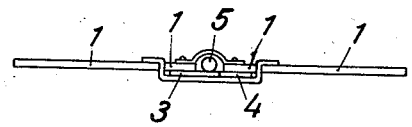

In the accompanying drawing Fig. 1 is a partially sectioned and partially diagrammatic elevation showing one embodiment of the invention, while Fig. 2 is a plan view thereof.

A vertically mounted two-part scale 1 is subdivided into sections which from the lower end upwards and alternately on the left- and right-hand sides of the scale accord with the successive positions to which an appropriate selecting device is adjusted. This scale is covered in the middle with an opaque plate 2 which has its longitudinal edges formed as teeth. The gaps between these teeth serve for marking the desired scale section by means of the pointer. This pointer comprises two arms 3, 4 which are so offset in relation to each other that, whenever one arm, such as 3, is behind any one of these gaps, the other arm 4 will be behind a tooth, thus being concealed from view. Owing to this construction, when changing from one scale section to another either on the left- or right-hand side of the scale the path of the pointer will be shortest.

The pointer is driven by means of a flexible member 5, such as a wire, band, a helical spring or the like. This member is actuated directly, that is, without the aid of an intermediary member, from a knob 6 rigidly united with a disc 7 to which the member 5 is fixed. The means best adapted for guiding the member 5 is a socket 8 which has longitudinal slots to receive and guide the pointer 3, 4 fastened to member 5. 9 denotes the initial position of the pointer which in this position is concealed from view by suitable means not shown.

The scale 1 may be of a transparent material and may be illuminated from behind. Equally, the pointer 3, 4 may be of material permeable to light.

What is claimed is:

1. An indicator comprising a scale having two parts located beside each other, an elongated cover plate arranged in front of said parts and having teeth along longitudinal edges thereof, a pointer having two arms positioned adjacent said teeth and movable in a direction parallel to the longitudinal edges of said plate, said arms having a width not exceeding the width of one of said teeth and one of said arms being centrally aligned with respect to one of said teeth on one edge of said plate, while the other arm is centrally aligned with respect to a gap between the teeth on the other edge of said plate, and means for moving said pointer along said plate.

2. An indicator comprising a scale having two parts located beside each other, an elongated cover plate arranged in front of the adjacent edges of said parts and having aligned teeth on opposed longitudinal edges thereof, a pointer having two opposed arms positioned transversely of the longitudinal edges of said plate and slidably mounted on said plate, said arms being offset from each other along the longitudinal edges of said plate a distance equal to the pitch of said teeth and each arm having a width not exceeding the width of one of said teeth, and means for sliding said pointer along said plate in a direction parallel to the longitudinal edges thereof.

3. An indicator according to claim 2 wherein said pointer is movably positioned between said cover plate and said scale.

4. An indicator according to claim 2, comprising a rotatable knob and a member under control of this knob and adapted to directly drive the pointer.

5. An indicator according to claim 2, wherein the scale is transparent, while the teeth of said cover plate are opaque.

6. An indicator according to claim 2, wherein the pointer is transparent.

EMIL FALLER.
PAUL ULLRICH.